US009955342B2

(12) United States Patent
Ochiai et al.

(10) Patent No.: US 9,955,342 B2
(45) Date of Patent: Apr. 24, 2018

(54) IN-VEHICLE COMMUNICATION SYSTEM

(71) Applicant: TOYOTA JIDOSHA KABUSHIKI KAISHA, Toyota-shi, Aichi-ken (JP)

(72) Inventors: Yuta Ochiai, Anjo (JP); Mitsutoshi Kato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 14/931,155

(22) Filed: Nov. 3, 2015

(65) Prior Publication Data

US 2016/0135038 A1 May 12, 2016

(30) Foreign Application Priority Data

Nov. 6, 2014 (JP) ................................. 2014-226318

(51) Int. Cl.

*H04W 8/22* (2009.01)
*B60R 25/01* (2013.01)
*G07C 5/00* (2006.01)
*H04W 84/12* (2009.01)
*H04W 88/16* (2009.01)
*H04L 12/40* (2006.01)

(52) U.S. Cl.

CPC ............... *H04W 8/22* (2013.01); *B60R 25/01* (2013.01); *G07C 5/008* (2013.01); *G07C 2205/02* (2013.01); *H04L 2012/40273* (2013.01); *H04W 84/12* (2013.01); *H04W 88/16* (2013.01)

(58) Field of Classification Search

CPC ....... H04W 8/22; H04W 88/16; H04W 84/12; G07C 5/008; G07C 2205/02; B60R 25/01; H04L 2012/40273

USPC ............................................................ 701/36

See application file for complete search history.

(56) References Cited

U.S. PATENT DOCUMENTS

| | | | |
|---|---|---|---|
| 2003/0117298 A1 | 6/2003 | Tokunaga et al. | |
| 2003/0137409 A1 | 7/2003 | Kikkawa et al. | |

FOREIGN PATENT DOCUMENTS

| | | | |
|---|---|---|---|
| EP | 1309132 A1 | | 5/2003 |
| JP | 2002-016614 A | | 1/2002 |
| JP | 3832347 B2 | | 10/2006 |
| JP | 2013-063691 A | | 4/2013 |
| JP | 2013-107454 A | | 6/2013 |
| JP | 2013-129291 A | | 7/2013 |
| JP | 2013-192090 A | | 9/2013 |
| WO | 2013/051122 A1 | | 4/2013 |
| WO | WO 2013/051122 A1 | * | 4/2013 |

OTHER PUBLICATIONS

Mar. 15, 2016 Search Report issued in European Patent Application No. 15193117.7.

* cited by examiner

*Primary Examiner* — Brian P Sweeney
(74) *Attorney, Agent, or Firm* — Oliff PLC

(57) ABSTRACT

An in-vehicle communication system includes a gateway that relays communication between an external apparatus and an in-vehicle LAN; and a communication permission determination unit that inhibits communication between the external apparatus and the in-vehicle LAN through the gateway if it is determined that a vehicle having the in-vehicle LAN mounted therein is in a parking state based on acquired predetermined vehicle information.

6 Claims, 4 Drawing Sheets

IN-VEHICLE COMMUNICATION SYSTEM

INCORPORATION BY REFERENCE

The disclosure of Japanese Patent Application No. 2014-226318 filed on Nov. 6, 2014 including the specification, drawings and abstract is incorporated herein by reference in its entirety.

BACKGROUND OF THE INVENTION

1. Field of the Invention

The present invention relates to an in-vehicle communication system that includes a gateway for relaying communication between an external apparatus and an in-vehicle LAN.

2. Description of Related Art

Conventionally, for use in an in-vehicle gateway that transfers data, a technology (data filtering technology) is known that determines whether to transfer data according to the contents of data or the state of the vehicle (for example, Japanese Patent Application Publication No. 2002-16614 (JP 2002-16614 A)).

Japanese Patent Application Publication No. 2002-16614 (JP 2002-16614 A)) describes that unauthorized access is prevented by not allowing incomplete data or illegal data from passing through the gateway. Japanese Patent Application Publication No. 2002-16614 (JP 2002-16614 A)) also describes that the amount of data is limited according to the vehicle state (for example, power state, traveling state, or parking state, etc.).

However, when data is filtered according to the contents of data as described in Japanese Patent Application Publication No. 2002-16614 (JP 2002-16614 A)), legal data and illegal data cannot be distinguished depending upon the data that is transferred, sometimes with the possibility that unauthorized access by a malicious third party is permitted. In addition, the primary purpose of limiting the amount of data according to the vehicle state, as described in Japanese Patent Application Publication No. 2002-16614 (JP 2002-16614 A)), is to reserve the traffic. This means that there is room for improvement from the viewpoint of preventing unauthorized access by a malicious third party.

SUMMARY OF THE INVENTION

The invention provides an in-vehicle communication system that can more reliably prevent a malicious third party from making unauthorized access to an in-vehicle LAN through a gateway when communication between an external apparatus and the in-vehicle LAN is relayed through the gateway.

An in-vehicle communication system in one aspect of the present invention includes a gateway that is configured to relay communication between an external apparatus and an in-vehicle LAN; and a communication permission determination unit that is configured to inhibit communication between the external apparatus and the in-vehicle LAN through the gateway if it is determined that a vehicle having the in-vehicle LAN mounted therein is in a parking state based on acquired predetermined vehicle information.

According to this aspect of the present invention, the in-vehicle communication system can be provided that can more reliably prevent a malicious third party from making unauthorized access to the in-vehicle LAN through the gateway when communication is relayed between the external apparatus and the in-vehicle LAN through the gateway.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the present invention are described below with reference to the drawings.

First Embodiment

First, the configuration of an in-vehicle communication system 1 in this embodiment is described below.

Figure 1:
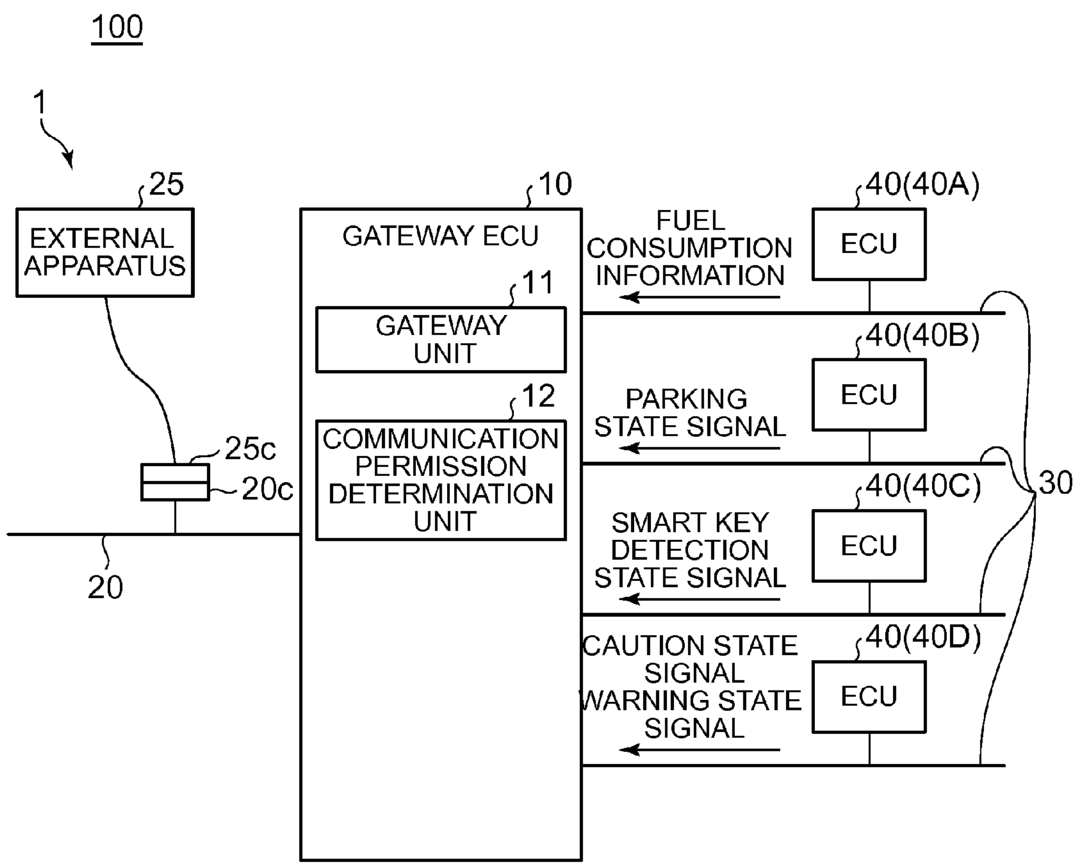
FIG. 1 is a general configuration diagram showing an example of the configuration of an in-vehicle communication system.

FIG. 1 is a general configuration diagram showing an example of the configuration of the in-vehicle communication system 1 in this embodiment. The in-vehicle communication system 1, mounted in a vehicle 100, is configured to allow diagnostic communication to be carried out between an external apparatus 25, connected to the vehicle 100, and an in-vehicle LAN 30 (ECUs connected to the in-vehicle LAN 30).

The "diagnostic communication" refers to communication in which a request to send self-diagnostic information (information that is collected by each ECU 40 to describe the failure diagnosis of the ECU 40 itself or its subordinate sensors and actuators) is sent from the external apparatus 25 to each ECU 40 and, in response to the request, the self-diagnostic information is sent from each ECU 40 to the external apparatus 25. For example, the "self-diagnostic information" includes Diagnostic Trouble Code (DTC) and the data detected by various sensors (Freeze Frame Data (FFD)).

As shown in FIG. 1, the in-vehicle communication system 1 includes a gateway ECU 10, an external bus 20, the external apparatus 25, the in-vehicle LAN 30, and the ECUs 40.

The gateway Electronic Control Unit (ECU) 10 is an example of a communication relay unit that physically separates the external bus 20, to which the external apparatus 25 is connected, and the in-vehicle LAN 30 and, at the same time, relays diagnostic communication between the external apparatus 25, connected to the external bus 20, and the in-vehicle LAN 30. The gateway ECU 10 converts data from one medium or to another or from one protocol to another on the network to allow the diagnostic communication to be carried out. In addition, the gateway ECU 10 performs various types of control processing for the data relay (data transfer) between the external apparatus 25 and the in-vehicle LAN 30. The gateway ECU 10, configured by a microcomputer, may execute various programs, stored in the ROM, on the CPU to perform various types of control processing.

The gateway ECU 10 includes the following two functional units: gateway unit 11 and communication permission determination unit 12. When the gateway ECU 10 is configured by a microcomputer, the gateway unit 11 and the communication permission determination unit 12 may be each implemented by executing the corresponding program on the CPU.

The gateway unit 11 is a unit that transfers data between the external apparatus 25 and each of the ECUs 40 in the in-vehicle LAN 30. The gateway unit 11 converts data from one medium to another or from one protocol to another between the external apparatus 25 and the in-vehicle LAN 30 (each ECU 40 in the in-vehicle LAN 30) to carry out two-way communication. For example, the gateway unit 11 receives a communication frame, which requests the transmission of self-diagnostic information, from the external apparatus 25, converts the frame to the data compatible with the in-vehicle LAN 30 (ECU 40 in the in-vehicle LAN 30), and sends the converted data to the corresponding ECU 40 over the in-vehicle LAN 30. Similarly, the gateway unit 11 receives a communication frame, which describes the self-diagnostic information, from each ECU 40, converts the communication frame to the data compatible with the external apparatus 25, and sends the converted data to the external apparatus 25 via the external bus 20.

The communication permission determination unit 12 is a unit (communication permission determination unit) that determines whether to permit data transfer between the external apparatus 25 and the in-vehicle LAN 30 (each ECU 40 in the in-vehicle LAN 30). If the communication permission determination unit 12 permits data transfer between the external apparatus 25 and the in-vehicle LAN 30 (each ECU 40 in the in-vehicle LAN 30), the gateway unit 11 transfers data between the external apparatus 25 and the in-vehicle LAN 30. Conversely, if the communication permission determination unit 12 does not permit (inhibits) data transfer between the external apparatus 25 and the in-vehicle LAN 30 (each ECU 40 in the in-vehicle LAN 30), the gateway unit 11 does not transfer data between the external apparatus 25 and the in-vehicle LAN 30. The processing performed by the communication permission determination unit 12 will be described later in detail.

In this embodiment, though the gateway unit 11 and the communication permission determination unit 12 are implemented as the function of the same gateway ECU 10, the function of the communication permission determination unit 12 may also be provided outside the gateway ECU 10 (gateway unit 11). That is, the function of the gateway unit 11 and the communication permission determination unit 12 may be provided by the following two devices: one is the relay device (gateway) that relays communication between the external apparatus 25 and the in-vehicle LAN 30 and the other is the processing device, provided separately from the relay device, that has the function of the communication permission determination unit 12.

The external bus 20 is provided to connect the gateway ECU 10 and the external apparatus 25. The external bus 20 has a vehicle-side connector 20*c* to which the external apparatus 25 can be connected.

The vehicle-side connector 20*c* may be in any mode (form, specification) as long as the external apparatus 25 can be connected to the vehicle 100 (external bus 20). For example, the vehicle-side connector 20*c* may be a DCL3 connector for failure diagnosis.

The external apparatus 25 is a device, connected to the vehicle 100, has the program rewriting function that acquires the self-diagnostic information from each ECU mounted on the vehicle and rewrites the program of the failure diagnosis function for failure diagnosis and the program of each ECU 40. By connecting an external-apparatus-side connector 25*c*, provided at the tip of the communication cord extended from its main body, to the vehicle-side connector 20*c*, the external apparatus 25 is connected to the gateway ECU 10 so that communication can be carried out between them.

The in-vehicle LAN 30, an in-vehicle network mounted in the vehicle 100, may be a network conforming to the communication standard such as Controller Area network (CAN), Local Interconnect Network (LIN), and FlexRay. The in-vehicle LAN 30 connects the electronic control units (ECUs 40), which perform various control processing for the vehicle 100, via the bus to form the network. This network allows the signals, detected by various sensors subordinate to each of the ECUs 40, to be shared among the ECUs 40. As shown in FIG. 1, the in-vehicle LAN 30 has the configuration in which the ECUs 40, each connected to the corresponding bus, are connected via the gateway ECU 10. The in-vehicle LAN 30 may have a configuration in which the ECUs 40 and the gateway ECU 10 are connected to one bus.

The ECUs 40, each of which is an electronic control unit connected to the in-vehicle LAN 30 to perform predetermined control processing in the vehicle 100, may have various subordinate sensors and actuators required for the control contents. As shown in FIG. 1, the ECUs 40 include ECUs 40A, 40B, 40C, and 40D each connected to the bus extended from the gateway ECU 10.

Each of the ECUs 40 (40A to 40D) has the function (self-diagnostic function) to perform the failure diagnosis of itself and its subordinate sensors and actuators and stores the self-diagnostic result in the internal memory. In response to a self-diagnostic information sending request from the external apparatus 25, the ECU 40 sends the self-diagnostic information via the gateway ECU 10. The ECU 40 (40A to 40D) may store the detection data (detection signal) on its subordinate sensors, together with the failure diagnosis result, into the internal memory.

In this embodiment, the ECU 40A is an electronic control unit that controls the engine mounted in the vehicle 100. The ECU 40A is configured to be able to store the information on the fuel consumption of the vehicle 100 (fuel consumption information) in the internal memory and, in response to a sending request from the external apparatus 25, to send the fuel consumption information. The "fuel consumption information" may include the information on the engine rotation speed and the fuel injection amount detected by the sensors subordinate to the ECU 40A.

In this embodiment, the ECU 40B is an electronic control unit that controls the door locking/unlocking of the vehicle 100. The ECU 40B is configured to be able to generate the parking state signal, which indicates whether "all doors of the vehicle 100 are closed and locked through the wireless key operation or the smart key operation", and to send the generated parking state signal to the gateway ECU 10 via the in-vehicle LAN 30. The ECU 40B may also find that the doors are locked through the wireless key operation or the smart key operation by receiving the signal from the ECU 40C that, as described below, authenticates the wireless key or the smart key by comparing the ID codes via two-way communication. In addition, the ECU 40B may acquire the signal, corresponding to the door open/close state, from the subordinate door courtesy switch.

In this embodiment, the ECU 40C is an electronic control unit that authenticates the wireless key or the smart key. The ECU 40C is configured to be able to send the smart key detection state signal, which indicates whether the smart key is detected in the passenger space, to the gateway ECU 10 via the in-vehicle LAN 30. As described above, the ECU 40C authenticates the wireless key or the smart key by comparing the ID codes via two-way communication. The ECU 40C may also detect the smart key in the passenger space by receiving the response signal from the smart key, which corresponds to the request signal and is sent via the subordinate in-vehicle transmitter (not shown), and then by authenticating the smart key.

In this embodiment, the ECU 40D is an electronic control unit that controls the security (vehicle theft prevention) function (function to activate the horn (not shown) or the indicator (not shown) upon detection of an illegal entry into the passenger space and to issue a warning). The ECU 40D is configured to be able to send the caution state signal, which indicates whether the vehicle 100 is in the security caution state, and the warning state signal, which indicates that the vehicle 100 is in the warning state, to the gateway ECU 10 via the in-vehicle LAN 30. The "security caution state" refers to the state in which the security function described above is enabled. When all doors of the vehicle 100 are locked through the smart key operation, the ECU 40D may place the vehicle 100 in the security function enabled state. The "security warning state" refers to the state in which an illegal entry into the passenger space is detected in the security caution state and the horn or the indicator is activated to issue a warning.

The number of ECUs 40 in the in-vehicle LAN 30 is exemplary, and any number of ECUs 40 may be included in the in-vehicle LAN 30, each as a node. The controlled objects and the control contents of each ECU 40 (40A-40D) in the in-vehicle LAN 30 described above are exemplary, and the controlled objects and control contents of each ECU 40 included in the in-vehicle LAN 30 are arbitrary.

Next, the communication permission determination processing performed by the in-vehicle communication system 1 (gateway ECU 10) in this embodiment is described below.

Figure 2:
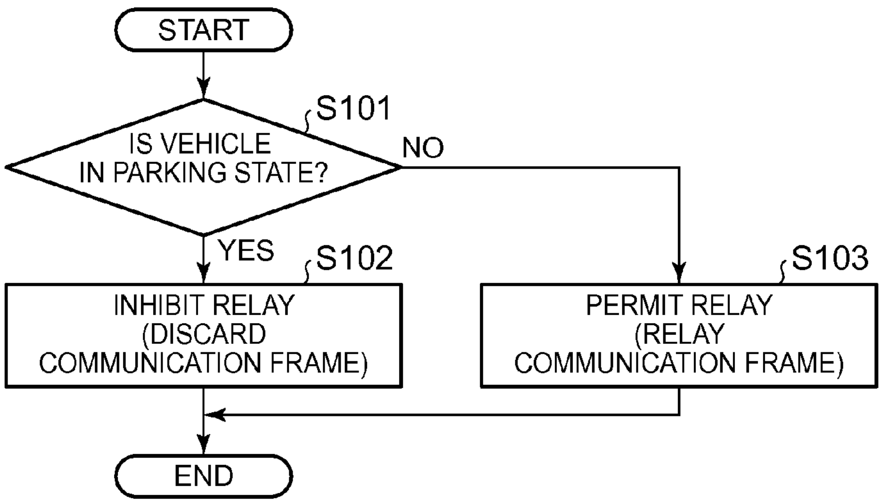
FIG. 2 is a flowchart showing an example of communication permission determination processing performed by an in-vehicle communication system (gateway ECU) in a first embodiment.

FIG. 2 is a flowchart showing an example of the communication permission determination processing performed by the in-vehicle communication system 1 (gateway ECU 10) in this embodiment. This flow is executed each time either a communication frame from the external apparatus 25 to the in-vehicle LAN 30 or a communication frame from each ECU 40 in the in-vehicle LAN 30 to the external apparatus 25 is input to the gateway ECU 10.

In step S101, the communication permission determination unit 12 determines whether the vehicle 100 is in the parking state. If it is determined that the vehicle 100 is in the parking state, the processing of the communication permission determination unit 12 proceeds to step S102. If it is determined that the vehicle 100 is not in the parking state, the processing of the communication permission determination unit 12 proceeds to step 103.

The "parking state" refers to the state in which the vehicle 100 is parked while the owner or a person equivalent to the owner (for example, a member of the owner's family or a dealer's officer at work) is not present around the vehicle 100. In other words, the "parking state" refers to the state in which a malicious third party is likely to make unauthorized access to the in-vehicle LAN 30.

The communication permission determination unit 12 determines that the vehicle 100 is in the parking state if any of the following four conditions is satisfied.

(1) The caution state signal indicates the security caution state of the vehicle 100.

That is, the security function is enabled, as described above, when the vehicle 100 is parked with the owner or the person equivalent to the owner away from the vehicle 100 after all doors of the vehicle 100 are locked through the smart key operation. Therefore, the communication permission determination unit 12 can determine that the vehicle 100 is in the parking state by receiving the caution state signal, which corresponds to the security caution state of the vehicle 100, from the ECU 40D.

(2) The warning state signal indicates the security warning state of the vehicle 100.

That is, the communication permission determination unit 12 can determine that the vehicle 100 is in the parking state, as in (1) described above, by receiving the warning state signal, which corresponds to the warning state that is caused when an illegal entry is detected in the security caution state, from the ECU 40D.

(3) The parking state signal indicates the "state in which all doors of the vehicle 100 are closed and locked through the wireless key operation or the smart key operation".

That is, the "state in which all doors of the vehicle 100 are closed and locked through the wireless key operation or the smart key operation" corresponds the state in which the vehicle 100 is parked with the owner or the person equivalent to the owner away from the vehicle 100. Therefore, the communication permission determination unit 12 can determine whether the vehicle 100 is in the parking state by receiving the parking state signal from the ECU 40B.

(4) The smart key detection state signal indicates that the smart key is not detected in the passenger space.

That is, the state in which the smart key is not detected in the passenger space corresponds to the state in which the vehicle 100 is parked with the owner or the person equivalent to the owner away from the vehicle 100. Therefore, the communication permission determination unit 12 can determine whether the vehicle 100 is in the parking state by receiving the smart key detection state signal from the ECU 40C.

When determining whether the vehicle 100 is in the parking state, the communication permission determination unit 12 may determine that the vehicle 100 is in the parking state not only if any of the four conditions described above is satisfied but also if the condition, in which the ignition switch (not shown) of the vehicle 100 is turned off (IG-OFF state), is satisfied.

In step S102, the communication permission determination unit 12 inhibits the relay (transfer) of a communication frame from the external apparatus 25 to the in-vehicle LAN 30 or from the in-vehicle LAN 30 to the external apparatus 25. In response, the gateway unit 11 discards the communication frame.

On the other hand, in step S103, the communication permission determination unit 12 permits the relay (transfer) of a communication frame from the external apparatus 25 to the in-vehicle LAN 30 or from the in-vehicle LAN 30 to the external apparatus 25. In response, the gateway unit 11 relays (transfers) the communication frame.

As described above, if it is determined that the vehicle 100 is in the parking state, the in-vehicle communication system 1 in this embodiment inhibits the relay (transfer) of a communication frame between the external apparatus 25 and the in-vehicle LAN 30. If it is determined that the vehicle 100 is not in the parking state, the in-vehicle communication system 1 permits the relay. This reliably prevents a malicious third party from making unauthorized access to the in-vehicle LAN 30 (each ECU 40 in the in-vehicle LAN 30).

That is, when the vehicle 100 is in the parking state, the owner or the person equivalent to the owner is away from the vehicle 100 and it is not likely that authorized access is made from the external apparatus 25 to the in-vehicle LAN 30. If such access is made, there is high possibility that the access is unauthorized access. Therefore, inhibiting communication between the external apparatus 25 and the in-vehicle LAN 30 when the vehicle 100 is in the parking state can reliably prevent a malicious third party from making unauthorized access to the in-vehicle LAN 30.

Second Embodiment

Next, a second embodiment is described below.

An in-vehicle communication system 1 in this embodiment differs from the in-vehicle communication system 1 in the first embodiment in that the system determines whether communication between the external apparatus 25 and the in-vehicle LAN 30 is permitted based on whether a failure is detected in the acquisition source of the vehicle information (information about the state of the vehicle 100) that is used for determining whether the vehicle 100 is in the parking state. The following describes this embodiment with emphasis on the description of the elements different from those in the first embodiment, using the same reference numeral to denote the same element in the first embodiment.

The configuration of the in-vehicle communication system 1 in this embodiment is shown in FIG. 1 as in the first embodiment and, therefore, the description is omitted.

Figure 3:
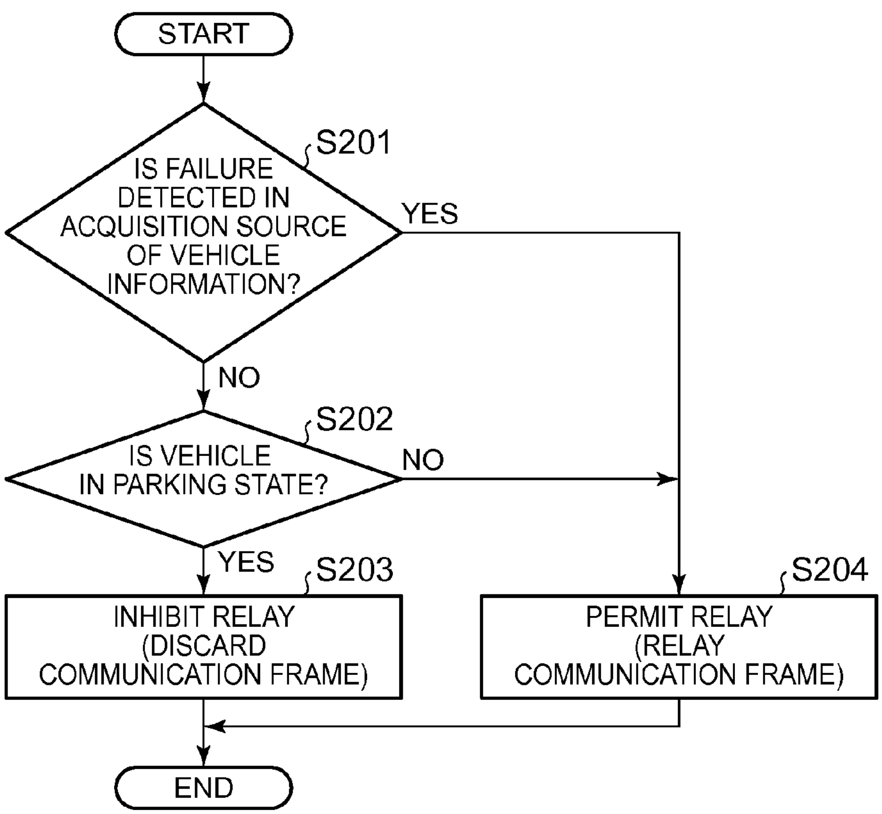
FIG. 3 is a flowchart showing an example of communication permission determination processing performed by an in-vehicle communication system (gateway ECU) in a second embodiment.

FIG. 3 is a flowchart showing an example of communication permission determination processing performed by the in-vehicle communication system 1 (gateway ECU 10) in this embodiment. This flow is executed each time either a communication frame from the external apparatus 25 to the in-vehicle LAN 30 or a communication frame from each ECU 40 in the in-vehicle LAN 30 to the external apparatus 25 is input to the gateway ECU 10.

In step S201, the communication permission determination unit 12 determines whether a failure is detected in the acquisition source of the vehicle information that is used in step S202 described below to determine whether the vehicle 100 is in the parking state. If it is determined that a failure is not detected in the acquisition source of the vehicle information, the processing of the communication permission determination unit 12 proceeds to step S202. If it is determined that a failure is detected in the acquisition source of the vehicle information, the processing of the communication permission determination unit 12 proceeds to step S204.

In this embodiment, if a failure is detected in none of the acquisition sources of the vehicle information used for determining whether the vehicle 100 is in the parking state, the processing proceeds to step S202. If a failure is detected in at least one of the acquisition sources of the vehicle information, the processing proceeds to step S204. However, it is also possible that the processing proceeds to step S202 if a failure is not detected in at least one of the acquisition sources of the vehicle information used for determining whether the vehicle 100 is in the parking state and that the processing proceeds to step S204 if a failure is detected in all acquisition sources of the vehicle information. In this case, the communication permission determination unit 12 determines, in step S202 described below, whether the vehicle 100 is in the parking state based on the vehicle information acquired from the acquisition source in which a failure is not detected.

In step S202, the communication permission determination unit 12 determines whether the vehicle 100 is in the parking state as in step S101 in the first embodiment. If it is determined that the vehicle 100 is in the parking state, the processing of the communication permission determination unit 12 proceeds to step S203. If it is determined that the vehicle 100 is not in the parking state, the processing of the communication permission determination unit 12 proceeds to step S204.

The communication permission determination unit 12 determines that the vehicle 100 is in the parking state if any of conditions (1) to (4) described above is satisfied as in the first embodiment.

In step S203, the communication permission determination unit 12 inhibits the relay (transfer) of a communication frame from the external apparatus 25 to the in-vehicle LAN 30 or from the in-vehicle LAN 30 to the external apparatus 25. In response, the gateway unit 11 discards the communication frame.

On the other hand, in step S204, the communication permission determination unit 12 permits the relay (transfer) of a communication frame from the external apparatus 25 to the in-vehicle LAN 30 or from the in-vehicle LAN 30 to the external apparatus 25. In response, the gateway unit 11 relays (transfers) the communication frame.

The determination processing in step S201 and step S202 may be performed in reverse order.

The following describes the method for determining, in step S201, whether a failure is detected in the acquisition sources of the vehicle information used for determining whether the vehicle 100 is in the parking state. In this embodiment, the vehicle information for determining whether the vehicle 100 is in the parking state includes the caution state signal, warning state signal, parking state signal, and the smart key detection state signal. The acquisition sources of these signals are the ECUs 40B, 40C, and 40D.

Figure 4:
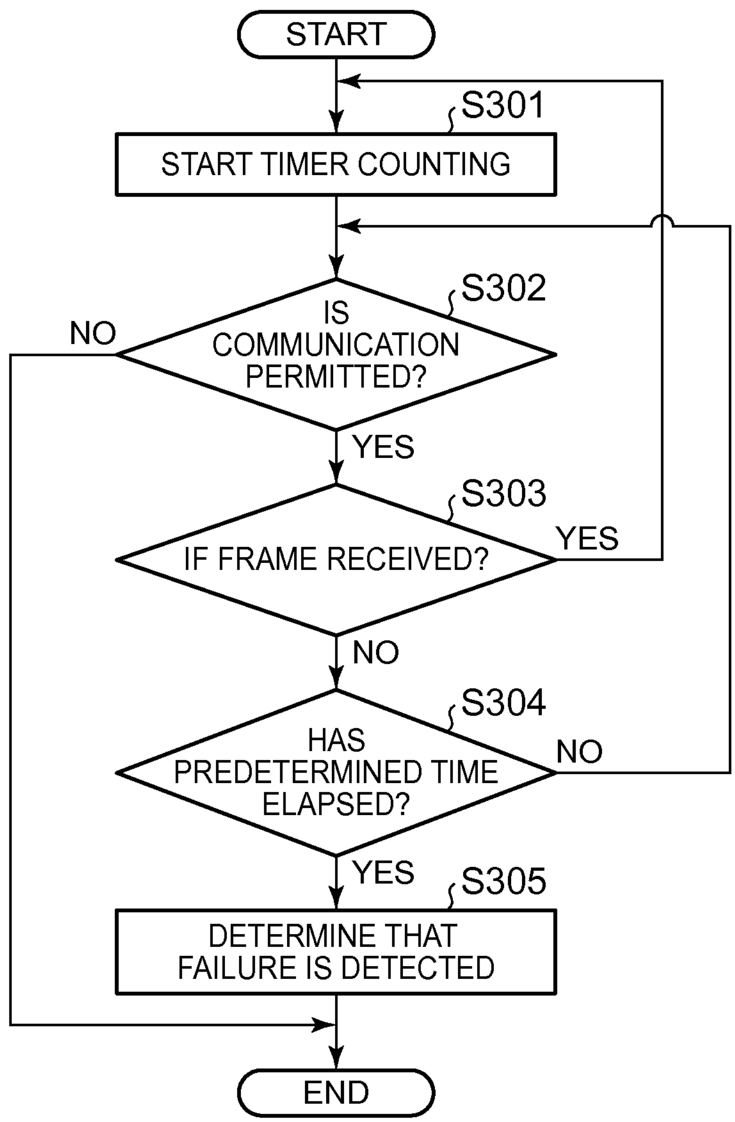
FIG. 4 is a flowchart showing an example of failure determination processing performed for the acquisition sources (ECUs) of vehicle information.

FIG. 4 is a flowchart showing an example of the failure determination processing performed by the in-vehicle communication system 1 (gateway ECU 10) for the acquisition sources (ECUs 40B to 40D) of the vehicle information. This flowchart is executed for each of the ECUs 40B to 40D each time the condition for permitting communication is established (each time the communication is permitted) for acquiring each piece of vehicle information (caution state signal, warning state signal, parking state signal, and the smart key detection state signal) that is sent from the ECUs 40B to 40D.

In step S301, the gateway ECU 10 starts internal timer counting.

In step S302, the gateway ECU 10 determines whether the communication is permitted. If the communication is permitted, the processing proceeds to step S303. If the communication is not permitted, the current processing is terminated.

In step S303, the gateway ECU 10 determines whether a communication frame is received. If a communication frame is received, the processing of the gateway ECU 10 returns to step S301. If a communication frame is not received, the processing proceeds to step S304.

In step S304, the gateway ECU 10 determines whether a predetermined time has elapsed. If the predetermined time has elapsed, the processing of the gateway ECU 10 proceeds to step S305. If the predetermined time has not yet elapsed, the processing returns to step S302.

The predetermined time is set to a value larger than the maximum value of the assumed frame reception interval in the communication in which the gateway ECU 10 acquires the vehicle information (caution state signal, warning state signal, parking state signal, and the smart key detection state signal) from the ECUs 40B to 40D.

In step S305, the communication permission determination unit 12 determines that a failure is detected and terminates the current processing.

In the example described above, the gateway ECU 10 monitors the frame reception interval in the communication in which the vehicle information (caution state signal, warning state signal, parking state signal, and the smart key detection state signal) is acquired from the ECUs 40B to 40D. If the elapsed time during which a frame is not received from the ECUs 40B to 40D exceeds the assumed reception interval, the gateway ECU 10 determines that a failure is detected.

The method for determining whether a failure is detected in the ECUs 40B to 40D is not limited to the example described above but any method may be used. For example, if a connection confirmation request is sent to the ECU 40B to 40D but no response to the connection confirmation request is received, the gateway ECU 10 may determine that a failure is detected in the ECUs 40B to 40D.

In this embodiment, the gateway ECU 10 acquires the vehicle information, used for determining whether the vehicle 100 is in the parking state, from the ECUs 40B to 40D via the in-vehicle LAN 30. Instead of this, it is supposed that, in some cases, the vehicle information is acquired from a sensor (for example, the door courtesy switch that detects the door open/close state) connected via a directly connected line. To detect a failure in a sensor connected via a directly connected line in this manner, it is possible to determine that a failure is detected in the sensor, for example, if the signal, corresponding to the IG-OFF state, is received from the sensor in the IG-ON state.

As described above, at least if it is determined that the vehicle 100 is in the parking state, the in-vehicle communication system 1 in this embodiment inhibits the relay (transfer) of a communication frame between the external apparatus 25 and the in-vehicle LAN 30 as in the first embodiment. This reliably prevents a malicious third party from making unauthorized access to the in-vehicle LAN 30 (each ECU 40 in the in-vehicle LAN 30).

On the other hand, if it is determined that an abnormality (failure) is detected in the acquisition source of the vehicle information used for determining whether the vehicle 100 is in the parking state, the in-vehicle communication system 1 in this embodiment permits the relay (transfer) of a communication frame between the external apparatus 25 and the in-vehicle LAN 30. This solves an inconvenience that is caused when an abnormality is generated in the acquisition source of the vehicle information used for determining whether the vehicle 100 is in the parking state.

That is, if a failure is detected in the acquisition sources (ECUs 40B to 40D) of the vehicle information used for determining whether the vehicle 100 is in the parking state, there is a possibility that the vehicle information (caution state signal, warning state signal, parking state signal, and the smart key detection state signal) to be sent becomes incorrect information. In such a case, the vehicle 100, though not actually in the parking state, is determined to be in the parking, sometimes resulting in a situation in which diagnostic communication cannot be carried out when there is a need for diagnostic communication between the external apparatus 25 and the in-vehicle LAN 30. To address this problem, if it is determined that an abnormality (failure) is detected in the acquisition sources of the vehicle information used for determining whether the vehicle 100 is in the parking state, the in-vehicle communication system 1 in this embodiment permits the relay (transfer) of a communication frame between the external apparatus 25 and the in-vehicle LAN 30. This method can solve such an inconvenience.

Third Embodiment

Next, a third embodiment is described below.

An in-vehicle communication system 1 in this embodiment differs from the in-vehicle communication system 1 in the first and second embodiments in that the permission of communication between the external apparatus 25 and the in-vehicle LAN 30 (each ECU 40 in the in-vehicle LAN 30) is determined considering the importance of information that may be transferred from the in-vehicle LAN 30 to the external apparatus 25. The ECU 40 corresponds to an internal apparatus of the invention. The following describes this embodiment with emphasis on the description of the elements different from those in the first and second embodiments, using the same reference numeral to denote the same element in the first and second embodiments.

The configuration of the in-vehicle communication system 1 in this embodiment is shown in FIG. 1 as in the first and second embodiments and, therefore, the description is omitted.

Figure 5:
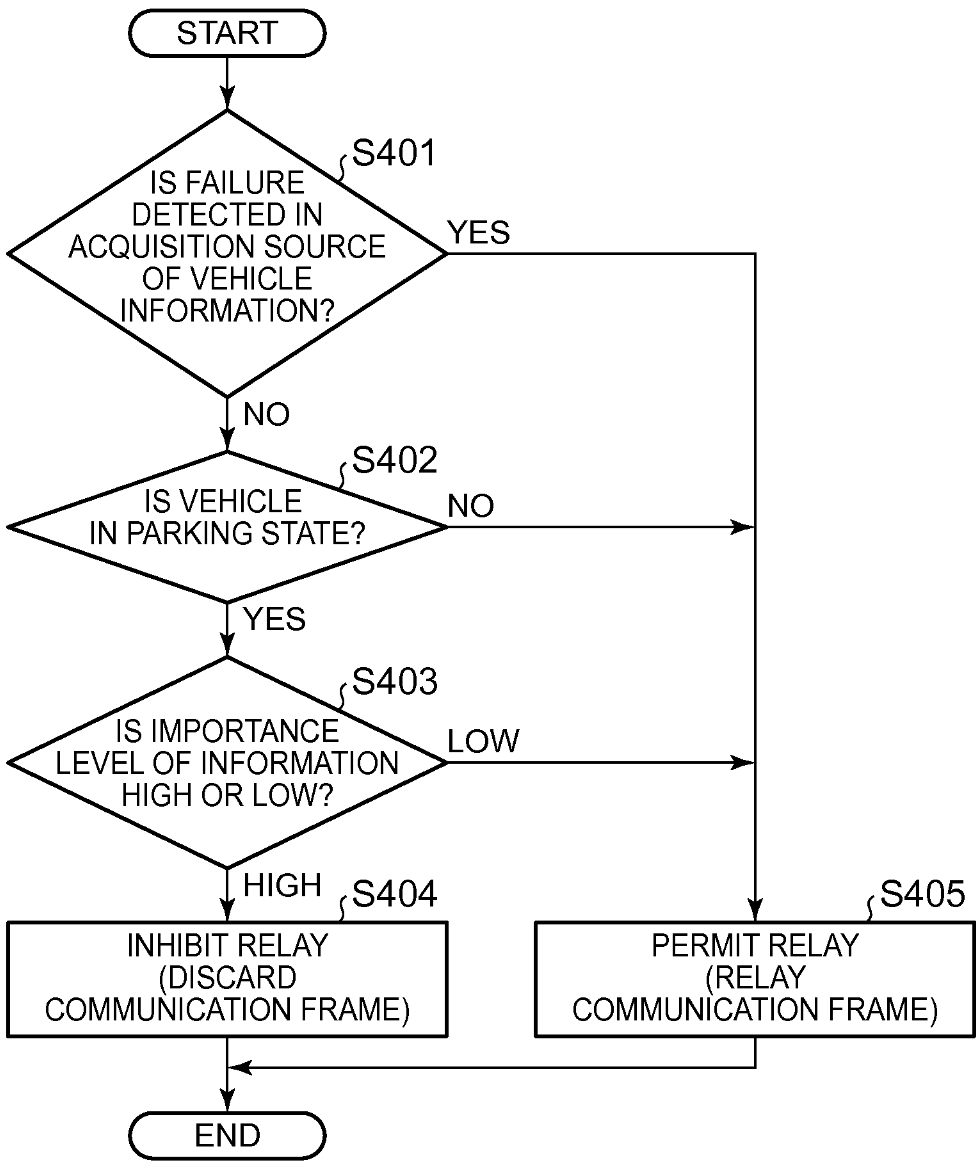
FIG. 5 is a flowchart showing an example of communication permission determination processing performed by an in-vehicle communication system (gateway ECU) in a third embodiment.

FIG. 5 is a flowchart showing an example of communication permission determination processing performed by the in-vehicle communication system 1 (gateway ECU 10) in this embodiment. This flow is executed each time either a communication frame from the external apparatus 25 to the in-vehicle LAN 30 or a communication frame from each ECU 40 in the in-vehicle LAN 30 to the external apparatus 25 is input to the gateway ECU 10.

In step S401, as in step S201 in the second embodiment, the communication permission determination unit 12 determines whether a failure is detected in the acquisition source of the vehicle information that is used in step S402 described below to determine whether the vehicle 100 is in the parking state. If it is determined that a failure is not detected in the acquisition source of the vehicle information, the processing of the communication permission determination unit 12 proceeds to step S402. If it is determined that a failure is detected in the acquisition source of the vehicle information, the processing of the communication permission determination unit 12 proceeds to step S405.

In this embodiment as in the second embodiment, if a failure is detected in none of the acquisition sources of the vehicle information used for determining whether the vehicle 100 is in the parking state, the processing proceeds to step S402. If a failure is detected in at least one of the acquisition sources of the vehicle information, the processing proceeds to step S405. However, it is also possible that the processing proceeds to step S402 if a failure is not detected in at least one of the acquisition sources of the vehicle information used for determining whether the vehicle 100 is in the parking state and that the processing proceeds to step S405 if a failure is detected in all acquisition sources of the vehicle information. In this case, the communication permission determination unit 12 determines, in step S402 described below, whether the vehicle 100 is in the parking state based on the vehicle information acquired from the acquisition source in which a failure is not detected.

In step S402, the communication permission determination unit 12 determines whether the vehicle 100 is in the parking state as in step S202 in the second embodiment. If it is determined that the vehicle 100 is in the parking state, the processing of the communication permission determination unit 12 proceeds to step S403. If it is determined that the vehicle 100 is not in the parking state, the processing of the communication permission determination unit 12 proceeds to step S405.

The communication permission determination unit 12 determines that the vehicle 100 is in the parking state if any of conditions (1) to (4) described above is satisfied as in the first and second embodiments.

In step S403, the communication permission determination unit 12 determines the importance level of the information stored in an ECU 40 in the in-vehicle LAN 30 that is the sending source or the sending destination of a communication frame. If it is determined that the importance level of the information stored in the ECU 40 is high, the processing of the communication permission determination unit 12 proceeds to step S404. If it is determined that the importance level of the information stored in the ECU 40 is low, the processing of the communication permission determination unit 12 proceeds to step S405.

The information, which is stored in each ECU 40 and the importance level of which is high, is the information that, if rewritten by a malicious third party, will have a very significant influence. A specific example is the program information on the condition, stored in the ECU 40D, for releasing the security caution state. The information, which is stored in each ECU 40 and the importance level of which is low, is the information that, if rewritten by a malicious third party, will not generate a problem or the information that is indicated by the meters in the passenger space. A specific example is the fuel consumption information (engine rotation speed and the fuel injection amount).

In step S404, the communication permission determination unit 12 inhibits the relay (transfer) of a communication frame from the external apparatus 25 to the in-vehicle LAN 30 or from the in-vehicle LAN 30 to the external apparatus 25. In response, the gateway unit 11 discards the communication frame.

On the other hand, in step S405, the communication permission determination unit 12 permits the relay (transfer) of a communication frame from the external apparatus 25 to the in-vehicle LAN 30 or from the in-vehicle LAN 30 to the external apparatus 25. In response, the gateway unit 11 relays (transfers) the communication frame.

The determination processing in step S401 to step S403 may be performed in any order.

In this embodiment, the processing in step S403 is added between step S202 and steps S203 and S204 in the flowchart of the communication permission determination processing in FIG. 3 in the second embodiment. Instead of this, the processing in step S403 may be added between step S101 and steps S102 and S103 in the flowchart of the communication permission determination processing in FIG. 2 in the first embodiment.

As described above, the in-vehicle communication system 1 in this embodiment inhibits the relay (transfer) of a communication frame between the external apparatus 25 and the in-vehicle LAN 30, as with the in-vehicle communication system 1 in the first and second embodiments, at least if it is determined that the vehicle 100 is in the parking state. This reliably prevents a malicious third party from making unauthorized access to the in-vehicle LAN 30 (each ECU 40 in the in-vehicle LAN 30).

In addition, if it is determined that an abnormality (failure) is detected in the acquisition source of the vehicle information used for determining whether the vehicle 100 is in the parking state, the in-vehicle communication system 1 in this embodiment permits the relay (transfer) of a communication frame between the external apparatus 25 and the in-vehicle LAN 30 as in the second embodiment. This solves an inconvenience that is caused when an abnormality is generated in the acquisition source of the vehicle information used for determining whether the vehicle 100 is in the parking state.

In addition, the in-vehicle communication system 1 in this embodiment determines the importance level of the information stored in each ECU 40 in the in-vehicle LAN 30 and, at the same time, permits communication between an ECU 40, which is one of the ECUs 40 in the in-vehicle LAN 30 and does not include high importance level information, and the external apparatus 25. For example, the in-vehicle communication system 1 in this embodiment permits communication between the ECU 40A, which stores the fuel consumption information, and the external apparatus 25 regardless of whether the vehicle 100 is in the parking state. This allows low importance level information (for example, fuel consumption information) to be sent from the ECU 40 in the in-vehicle LAN 30 to the external apparatus 25 regardless of whether the 100 is in the parking state, thus increasing convenience in acquiring the self-diagnostic information using the in-vehicle communication system 1. One exemplary use of this ability is that, with the external apparatus 25 kept connected to the external bus 20 during night time (while the gateway ECU 10 is parked), the fuel consumption information on the latest trip of the vehicle 100 is acquired and stored in the external apparatus 25 in advance so that the fuel consumption information, acquired by the external apparatus 25, can be immediately referenced the next day.

While the embodiments of the present invention have been described in detail, it is to be understood that the present invention is not limited to the specific embodiments above but that various modifications and changes may be added within the scope of the present invention described in claims.

For example, though an example of diagnostic communication carried out between the external apparatus 25 and the in-vehicle LAN 30 is described in the embodiments above, the contents of the embodiments above may be applied to an in-vehicle communication system in which the external apparatus and the in-vehicle LAN carry out communication in any mode. Such a system will perform a similar operation and have a similar effect.

What is claimed is:

1. An in-vehicle communication network system for use with a vehicle, the in-vehicle communication system comprising:

- a gateway configured to relay communication between an external apparatus and an in-vehicle LAN mounted in the vehicle; and
- a processor operatively coupled to the gateway, the processor being programmed to function as:
  - a communication permission determination unit configured to:

determine whether the vehicle is in a parking state based on acquired predetermined vehicle information; and inhibit communication between the external apparatus and the in-vehicle LAN by controlling the gateway to discard data transmitted from the external apparatus if the vehicle is determined as being in a parking state.

2. The in-vehicle communication network system according to claim 1, wherein:

the communication permission determination unit determines whether an abnormality is detected in an acquisition source of the predetermined vehicle information; and if it is determined that an abnormality is detected in the acquisition source, the communication permission determination unit permits communication between the external apparatus and the in-vehicle LAN through the gateway.

3. The in-vehicle communication network system according to claim 2, wherein the communication permission determination unit determines the abnormality is detected in the acquisition source when a time during which the vehicle information is not received in a communication in which the gateway acquires the vehicle information exceeds a predetermined time.

4. The in-vehicle communication network system according to claim 1, wherein:

the communication permission determination unit determines an importance level of information stored in apparatuses included in the in-vehicle LAN; and the communication permission determination unit permits communication between an internal apparatus and the external apparatus, the internal apparatus being one of the internal apparatuses included in the in-vehicle LAN, the internal apparatus not including information the importance level of which is determined high.

5. The in-vehicle communication network system according to claim 1, wherein the communication permission determination unit determines that the vehicle is in the parking state if at least one of a plurality of conditions is satisfied, the plurality of conditions including:

a first condition in which the vehicle is in a security caution state, a second condition in which the vehicle is in a security warning state, a third condition in which all doors of the vehicle are closed and locked through a wireless key operation or a smart key operation, and a fourth condition in which a smart key is not present in a passenger space of the vehicle.

6. An in-vehicle communication network system for use with a vehicle, the in-vehicle communication system comprising:

a gateway configured to relay communication between an external apparatus and an in-vehicle LAN mounted in the vehicle; and an electronic control unit operatively coupled to the gateway, the electronic control unit being programmed to:

acquire a predetermined vehicle information that identifies a parking state of the vehicle;

determine whether the vehicle is in the parking state based on the acquired predetermined vehicle information; and inhibit communication between the external apparatus and the in-vehicle LAN by controlling the gateway to discard data transmitted from the external apparatus if the vehicle is determined as being in the parking state.

* * * * *